US010288751B2

(12) United States Patent
Keers et al.

(10) Patent No.: US 10,288,751 B2
(45) Date of Patent: May 14, 2019

(54) MIGRATION VELOCITY ANALYSIS USING SEISMIC DATA

(75) Inventors: Henk Keers, Oslo (NO); Phil Kitchenside, Orpington (GB); Dave Nichols, Houston, TX (US); Susanne Rentsch, Brighton (GB); Gabriele Busanello, Mumbai (IN)

(73) Assignee: WESTERNGECO L.L.C., Houston, TX (US)

( * ) Notice: Subject to any disclaimer, the term of this patent is extended or adjusted under 35 U.S.C. 154(b) by 2148 days.

(21) Appl. No.: 12/575,648

(22) Filed: Oct. 8, 2009
(Under 37 CFR 1.47)

(65) Prior Publication Data
US 2011/0085413 A1 Apr. 14, 2011

(51) Int. Cl.
*G01V 1/38* (2006.01)
*G01V 1/28* (2006.01)

(52) U.S. Cl.
CPC .................................. *G01V 1/282* (2013.01)

(58) Field of Classification Search
CPC .................................................... G01V 1/282
USPC ........................................ 367/21–24; 702/18
See application file for complete search history.

(56) References Cited

U.S. PATENT DOCUMENTS

| 4,972,383 | A | * | 11/1990 | Lailly | G01V 1/282 367/38 |
|---|---|---|---|---|---|
| 5,991,237 | A | | 11/1999 | de Bazelaire | |
| 6,253,157 | B1 | * | 6/2001 | Krebs | G01V 1/303 367/73 |
| 7,373,252 | B2 | * | 5/2008 | Sherrill | G01V 1/30 702/17 |
| 2006/0239117 | A1 | * | 10/2006 | Singh | G01V 1/3808 367/20 |
| 2009/0003132 | A1 | | 1/2009 | Vassallo et al. | |

OTHER PUBLICATIONS

Billette et al., "Practical aspects and applications of 2D stereotoimography", Geophysics, vol. 68, No. 3 (May-Jun. 2003).*
Brandsberg-Dahl, Imaging-inversion and migration velocity analysis in the scattering-angle/azimuth domain, CWP-394, Center for Wave Phenomena Colorado School of Mines, Nov. 2001, pp. 6, 7, 46, 57-57 and 71-72.
PCT Search Report, dated Apr. 28, 2011, Application No. PCT/US2010/051911.
Yilmaz, O., and Chambers, R., "Migration Velocity Analysis by Wavefield Extrapolation," Geophysics, 1984, vol. 49 (10): pp. 1664-1674.
Symes, W. W., and Carazzone, J.. "Velocity Inversion by Differential Semblance Optimization," Geophysics, 1991, vol. 56(5): pp. 654-663.
Billette, F., and Lambare, G., "Velocity Macro-Model Estimation from Seismic Reflection Data by Stereotomography," Geophys. J. Int., 1998, vol. 135: pp. 671-690.
Billette, F., Le Begat, S., Podvin, P., Lambare, G., "Practical Aspects and Applications of 2D Stereotomography," Geophysics, 2003, vol. 68(3): pp. 1008-1021.

* cited by examiner

*Primary Examiner* — Krystine E Breier
(74) *Attorney, Agent, or Firm* — Kevin B. McGoff

(57) ABSTRACT

A technique includes receiving seismic data acquired by an array of seismic sensors during a towed marine survey of a subsurface and performing migration velocity analysis to determine a background velocity model of the subsurface based at least in part on particle motion derived from the seismic data.

14 Claims, 6 Drawing Sheets

MIGRATION VELOCITY ANALYSIS USING SEISMIC DATA

BACKGROUND

The invention generally relates to migration velocity analysis using seismic data.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones and/or accelerometers), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes receiving seismic data acquired by an array of seismic sensors during a towed marine survey of a subsurface and performing migration velocity analysis to determine a background velocity model of the subsurface based at least in part on particle motion derived from the seismic data.

In another embodiment of the invention, a system includes an interface and a processor. The interface receives seismic data acquired during a towed marine survey of a subsurface. The processor processes the seismic data to perform migration velocity analysis to determine a background velocity model of the subsurface based at least in part on particle motion derived from the seismic data.

Advantages and other features of the invention will become apparent from the following drawing, description and claims.

DETAILED DESCRIPTION

Figure 1:
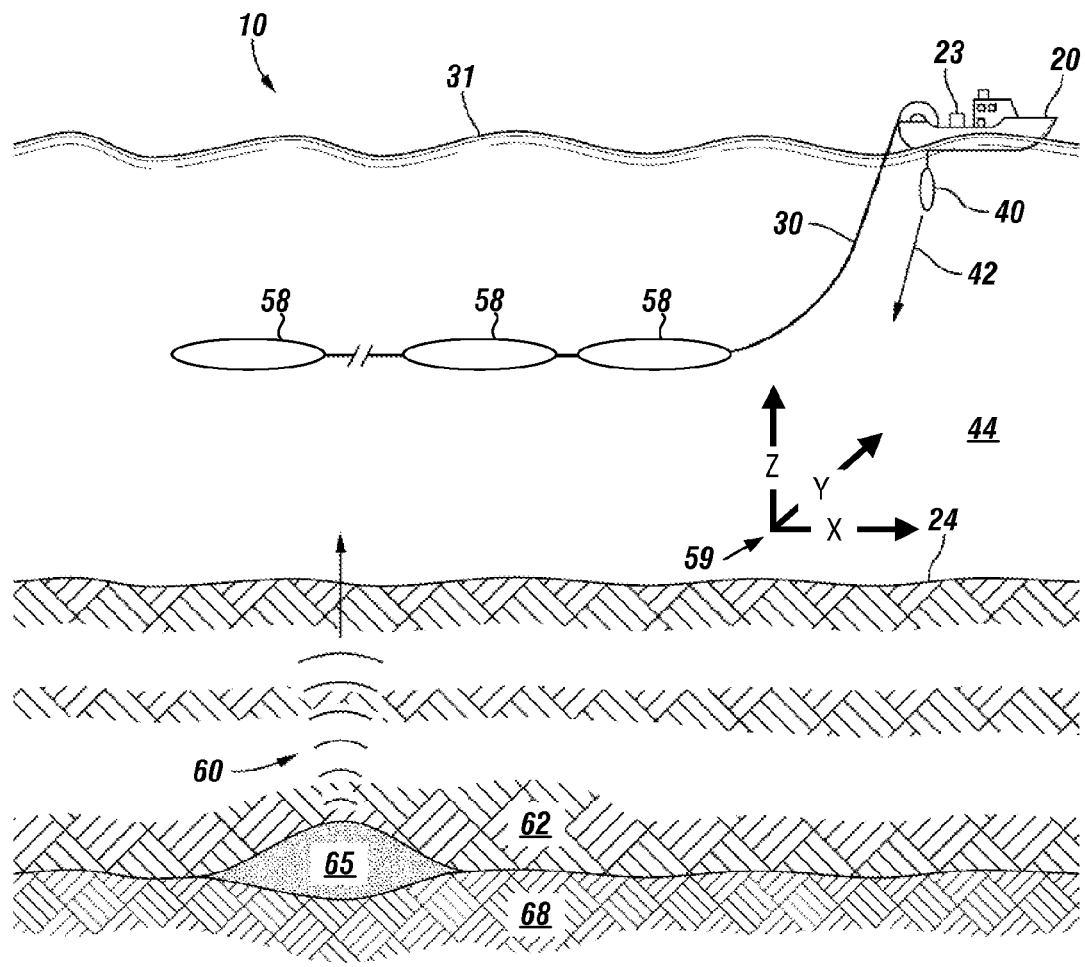
FIG. 1 is a schematic diagram of a marine-based seismic data acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (one exemplary streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which are mounted seismic sensors 58 that record seismic signals.

Although FIG. 1 depicts a single streamer 30, it is understood that different streamer spreads may be used in accordance with other embodiments of the invention. For example, in another embodiment of the invention, the seismic data acquisition system 10 may use an under/over spread, which contains a first streamer at a particular depth and a second streamer beneath the first streamer at a deeper depth. Other spreads may be used in accordance with other embodiments of the invention.

In accordance with embodiments of the invention, the seismic sensors 58 may be pressure sensors only or may be multi-component seismic sensors. For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction; another one of the pressure gradient sensors may acquire, at a particular point, seismic data indicative of the partial derivative of the pressure data with respect to the inline direction; and another one of pressure gradient sensors may acquire, at a particular point, seismic data indicative of the partial derivative of the pressure data with respect to the vertical direction.

The marine seismic data acquisition system 10 includes a seismic source 40 that may be formed from one or more seismic source elements, such as air guns, for example, which are connected to the survey vessel 20. Alternatively, in other embodiments of the invention, the seismic source 40 may operate independently of the survey vessel 20, in that the seismic source 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are emitted by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 as a reflection from the subsurface, as well as "down going" pressure waves that are produced by reflections of the pressure waves 60 from an air-water boundary 31.

Alternatively, in other embodiments of the invention no seismic source is operated, and an acoustic signal emitted by a source outside the acquisition system is used. More specifically, the systems and techniques that are described herein may be applied to passive seismic applications, such as (as a non-limiting example) an application in which seismic sensors are used to record earthquake-derived seismic activity.

The seismic sensors 58 generate signals (digital signals, for example), called "traces," which indicate the acquired measurements of the pressure wavefield and particle motion (if the sensors are particle motion sensors). The traces are recorded and may be at least partially processed by a signal processing unit 23 that is deployed on the survey vessel 20, in accordance with some embodiments of the invention. For example, a particular multi-component seismic sensor may provide a trace, which corresponds to a measure of a pressure wavefield by its hydrophone; and the sensor may provide one or more traces that correspond to one or more components of particle motion, which are measured by its accelerometers.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23.

Among the many challenges facing imaging, one of the bigger challenges is finding a correct background velocity model, or macro model. The assumption behind the imaging algorithms is that the velocity of the subsurface may be written as the following:

$$c_0(x) + \delta c(x), \quad \text{Eq. 1}$$

where "x" represents a point 108 in a subsurface 102; "$c_0$" represents the slowly varying part of the velocity model (i.e., the background model); and "$\delta c(x)$" represents the relatively quickly varying part of the velocity model. Stated differently, $\delta c(x)$ represents the reflectivity model, which gives the positions of discontinuities, faults etc. In seismic images, $\delta c(x)$, or an unscaled version of it, typically is displayed and the background velocity model $c_0$ is not. However, knowledge of the $c_0$ background velocity model is quite important, as the background velocity model is typically the starting point of all imaging algorithms. If the background velocity model is incorrect, then the geological discontinuities are mapped in the wrong positions with serious consequences for drilling, reservoir evaluation, etc.

The background velocity model $c_0$ is determined using migration velocity analysis (MVA). There are various types of MVA, such as normal moveout (NMO)/dip moveout (DMO) techniques, which are used for media that do not vary too strongly laterally, or semblance analysis. All of the MVA techniques use the redundancy present in the seismic data and often aim at flattening gathers at an image point, using the principle that if the velocity model is correct then the reflections from different traces at a point should all line up after correction for the travel time from the source to the scattering point and from the receiver to the scattering point.

Semblance analysis, stereotomography and several other MVA techniques are based on the single scattering assumption, which assumes that most of the energy travels from the source to the scatterer and then back to the receiver. Multiples derived from the scattered energy, especially the dominant surface multiples, ideally are removed before the velocity analysis using for example Radon transform and SRME techniques.

The MVA technique may use the travel times only. However, it is also possible to use the slopes of the travel time curves, as set forth in Billette, F., and G. Lambare, *Velocity Macro-Model Estimation From Seismic Reflection Data by Stereotomography*, Geophysical Journal International, 135, 671-690. 1998. This technique, called a stereotomography, has advantages over traditional MVA techniques, in that only locally coherent events are used and the computation of the slowness vector at the image point has already been done.

Figure 2A:
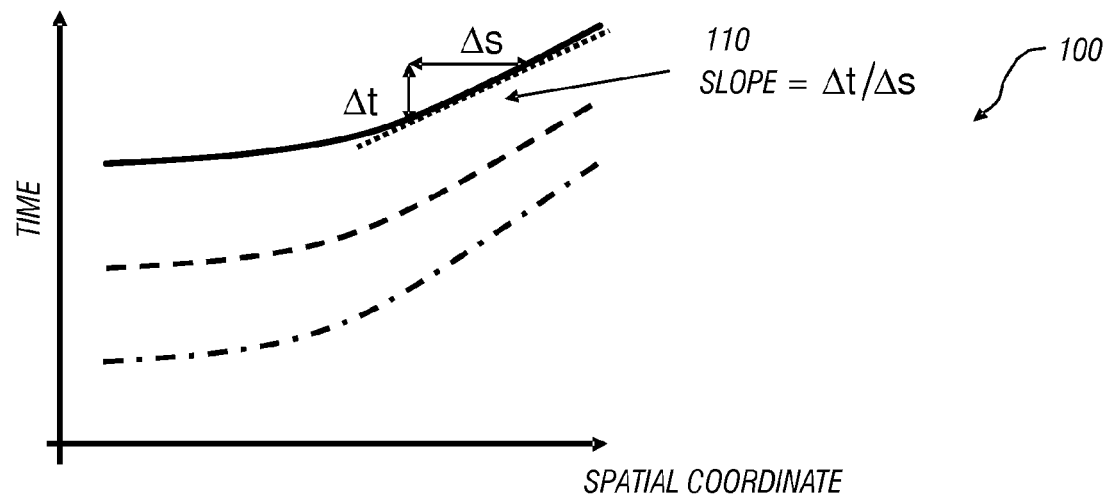
FIG. 2A is an exemplary time versus spatial coordinate plot derived from seismic data according to an embodiment of the invention.
Figure 2B:
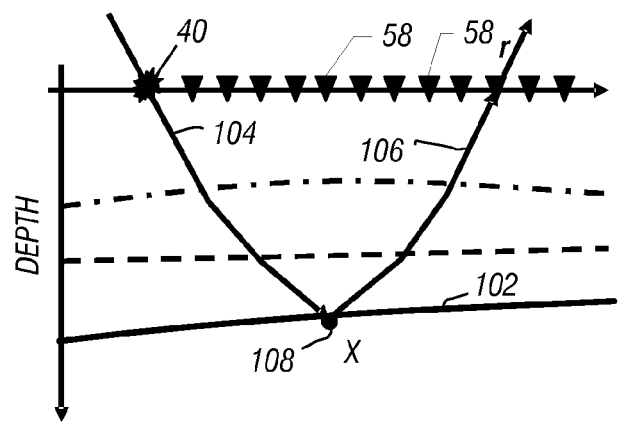
FIG. 2B is an illustration of rays involved with migration velocity analysis according to an embodiment of the invention.

Thus, the stereotomography technique picks, or selects, an event, such as the exemplary event that is depicted in FIGS. 2A and 2B. Each selected event has an associated ray 104 (FIG. 2B) that is incident upon the subsurface 102 and reflects off of a subsurface point 108 to produce a ray 106 that exits the subsurface 102. The stereotomography technique compares various measured parameters (such as the measured travel times from the seismic source to the subsurface point 108 and from the subsurface point 108 to the seismic receiver and one or more slopes in a time versus spatial coordinate plot 110 (FIG. 2A) derived from seismic data) to the corresponding calculated versions of these parameters, which are derived from the velocity model. Thus, the stereotomography technique may invert a cost function (constructed from the measured and calculated parameters) for the background velocity model.

The use of slopes in velocity analysis, such as the use of the slopes in the stereotomography analysis, has several advantages over the use of travel times only: 1.) there is no need for interfaces in the velocity model; 2.) the slopes in the data estimated using slant stacking gives more data and hence, if the data is reliable, a better constrained velocity model; and 3.) picking of the reflected events happens locally and not globally. Given the potential heterogeneity of the subsurface, the local picking of the reflected events is an important advantage.

As described herein, the particle motion data, such as the inline and crossline and vertical particle velocity measurements (as a non-limiting example) may be used in addition to or as a replacement of the "slopes," which are used in traditional stereotomography. A particular implementation of the stereotomography measurement using the particle motion data is described herein, although other MVA analysis techniques may be used with the particle motion data, in accordance with other embodiments of the invention.

Figure 3:
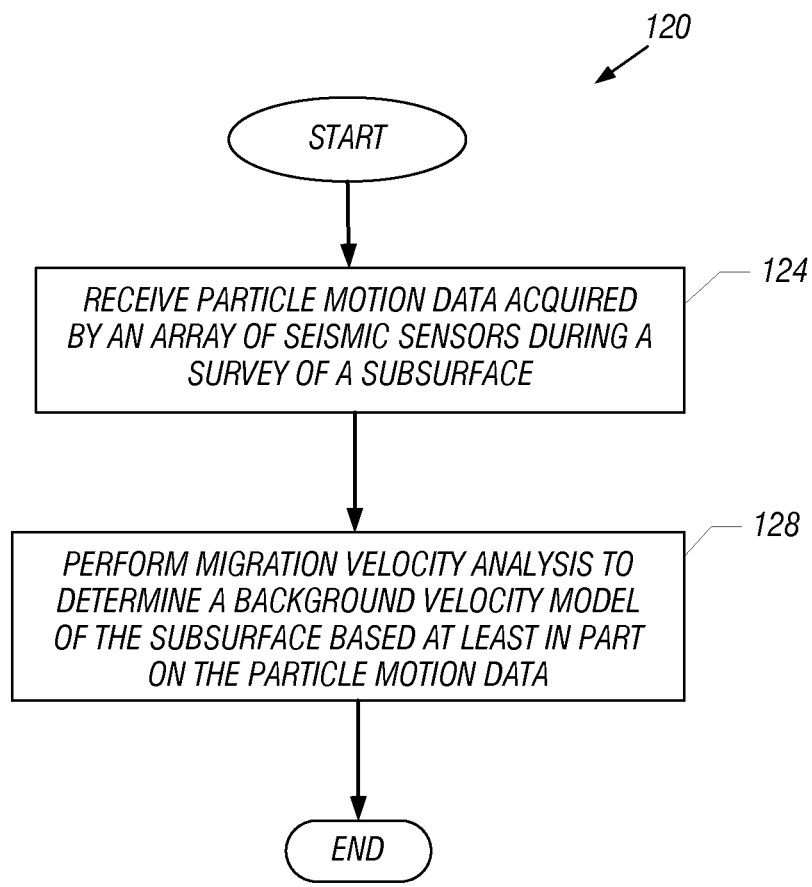
FIGS. 3, 4 and 5 are flow diagrams depicting techniques to perform migration velocity analysis using particle motion data according to embodiments of the invention.

Thus, referring to FIG. 3, in accordance with embodiments of the invention, a technique 120 includes receiving (block 124) particle motion data acquired by an array of seismic sensors during a survey of a subsurface. The technique 120 includes performing (block 128) migration velocity analysis to determine a background velocity model of the subsurface based at least in part on the particle motion data.

An exemplary migration velocity analysis that is based in part on particle motion data is described below. For the following example, it is assumed that an initial background velocity model is given and it is assumed that the source and receiver locations are known. In the first order scattering approximation, a reflection is the result of the result of the propagation of a ray from a source s to a subsurface point x, which produces a scattered ray to the receiver r. The rays may be traced from an initial guess of x and an initial guess of the take-off angles $\alpha_s$ (source ray) and $\alpha_r$ (receiver ray) of the corresponding rays at the surface. These rays reach the surface at points that are not co-located with the source and receiver positions. However, if the end points of the rays are not too far from the real receiver and source position and the observed corresponding slopes, then a cost function that is formed from these parameters may be inverted for the background velocity model. As described herein, the cost function may involve calculating the slopes from the particle motion data.

More specifically, the cost function describes a mismatch between the observed data $d_d=(s_d, r_d, p_{s,d}, p_{r,d}, T_{sr,d})$ and the computed data $d_c=(s_c, r_c, p_{s,c}, p_{r,c}, T_{sr,c})$, where "$p_{s,c}$" and "$p_{r,c}$" represent the takeoff angles, "$T_{sr,d}$" represents the observed travel time. In other words, $T_{sr,d}$ represents the sum of the travel time, $T_s$ of the ray from the source to the scattering point and the travel time $T_r$ of the ray from the scattering point to the receiver. A similar definition holds for $T_{sr,c}$, which is the total travel time that is determined, or calculated, using the background velocity model. Thus, the cost function may be defined as a function of the background velocity model m as follows:

$$d=d_d-d_c=S(m), \quad \text{Eq. 2}$$

where "S" represents a highly nonlinear function. The background velocity model m may be determined by inverting S as follows:

$$m=S^{-1}(d). \quad \text{Eq. 3}$$

Because Eq. 3 represents a relatively difficult nonlinear optimization problem to solve and because there is a relatively sufficient initial guess of the starting version of the background velocity model m (i.e., a starting model $m_0$, with corresponding data $d_0$ formed from the difference of the observed and calculated data), the inverse problem may be linearized. More specifically, an update of the model may be determined by linearizing Eq. 2 using a first Taylor expansion, as follows:

$$d_0+\delta d=S(m_0)+\partial S(m_0)/\partial m \, \delta m. \quad \text{Eq. 4}$$

Equation 4 may be simplified as follows:

$$\delta d=\partial S(m)/\partial m \, \delta m. \quad \text{Eq. 5}$$

Equation 5 represents a linear inverse problem, which may be solved in a variety of ways. The partial derivatives of S with respect to the initial takeoff angles and the travel time may be computed using kinematic and dynamic ray tracing.

In practice, the data contains errors that are described by the covariance matrix $C_d$. Also the starting model contains some errors, which are described by the model covariance matrix. These covariance matrices may be incorporated into the inversion. It is also useful to add damping and/or smoothing terms. In general, the damping term ensures that the new solution is not too far from the starting solution, and the smoothing term smoothes the inverted solution. As an example, the Laplacian operator may be used as a smoothing term. As a more specific example, the modified cost function may take on the following form:

$$F(m)=(S(m)-d)^T C_d^{-1}(S(m)-d)+A(m-m_0)^T(m-m_0), \quad \text{Eq. 6}$$

where "A" represents the damping parameter. Eq. 6 may also be linearized and the resulting equations may be solved in the least squares sense.

The resulting velocity model obtained by the inversion of Eq. 6 for the background velocity model m may be used in another inversion. Therefore, the process may be iterated until convergence is obtained. The final velocity model may be used in any prestack depth imaging algorithm.

Figure 4:
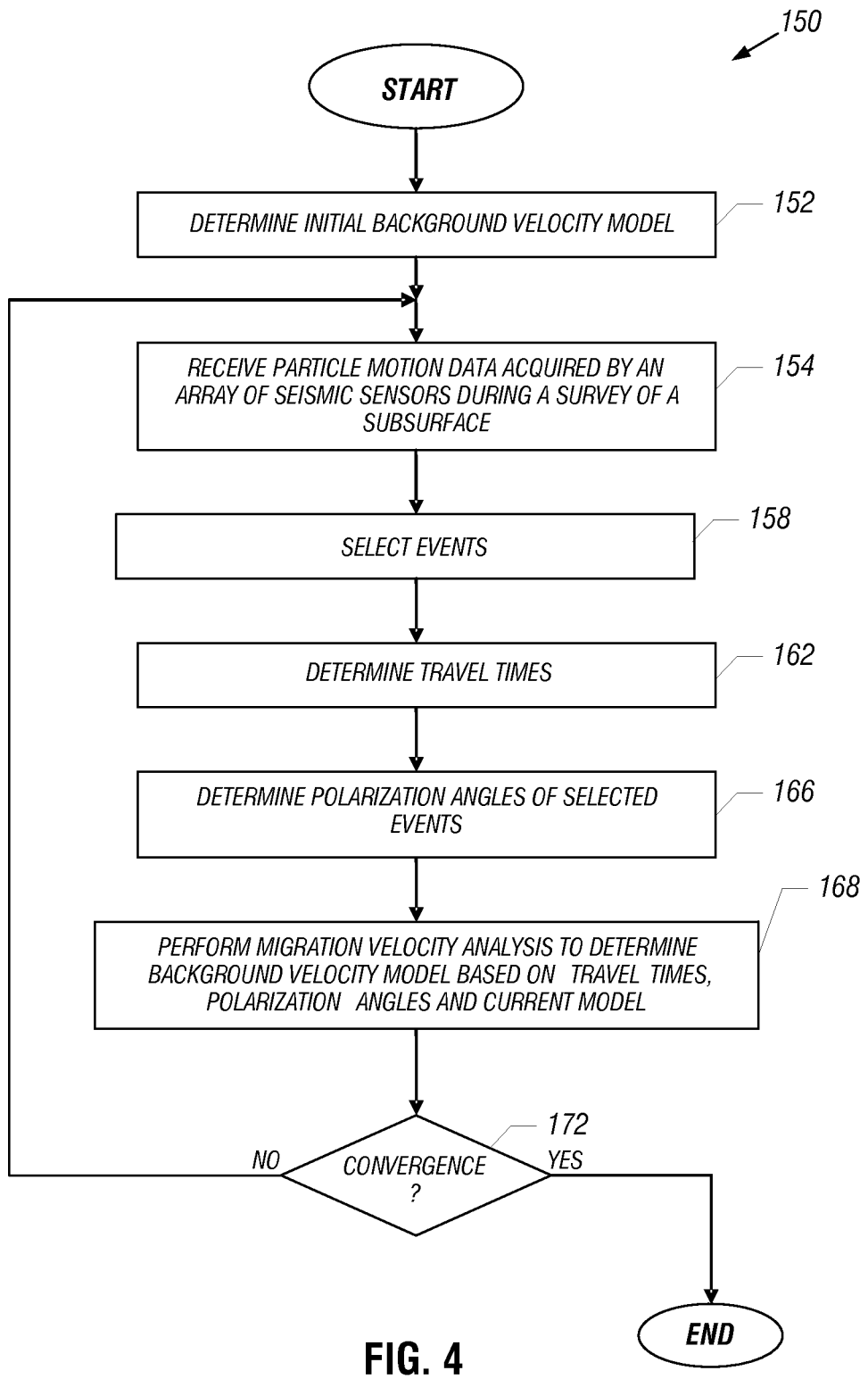

Referring to FIG. 4, in accordance with some embodiments of the invention, a technique 150 may be used for purposes of determining a background velocity model. Pursuant to the technique 150, an initial version of the background velocity model is determined (block 152) and seismic data, which are indicative of particle motion data are received, pursuant to block 154. Specific seismic events of the observed measurements are selected, pursuant to block 158 and travel times for the selected events are both calculated and determined from the seismic data, pursuant to block 162. Additionally, the particle motion data is used to determine, pursuant to block 166, the polarization angles (i.e., the takeoff angles) of the selected events. Migration velocity analysis (MVA) is used to determine the background velocity model based on the travel times, polarization angles and current model, pursuant to block 168. A determination is then made (diamond 172) whether model convergence has been reached. If not, control returns to block 154 for another iteration.

Figure 5:
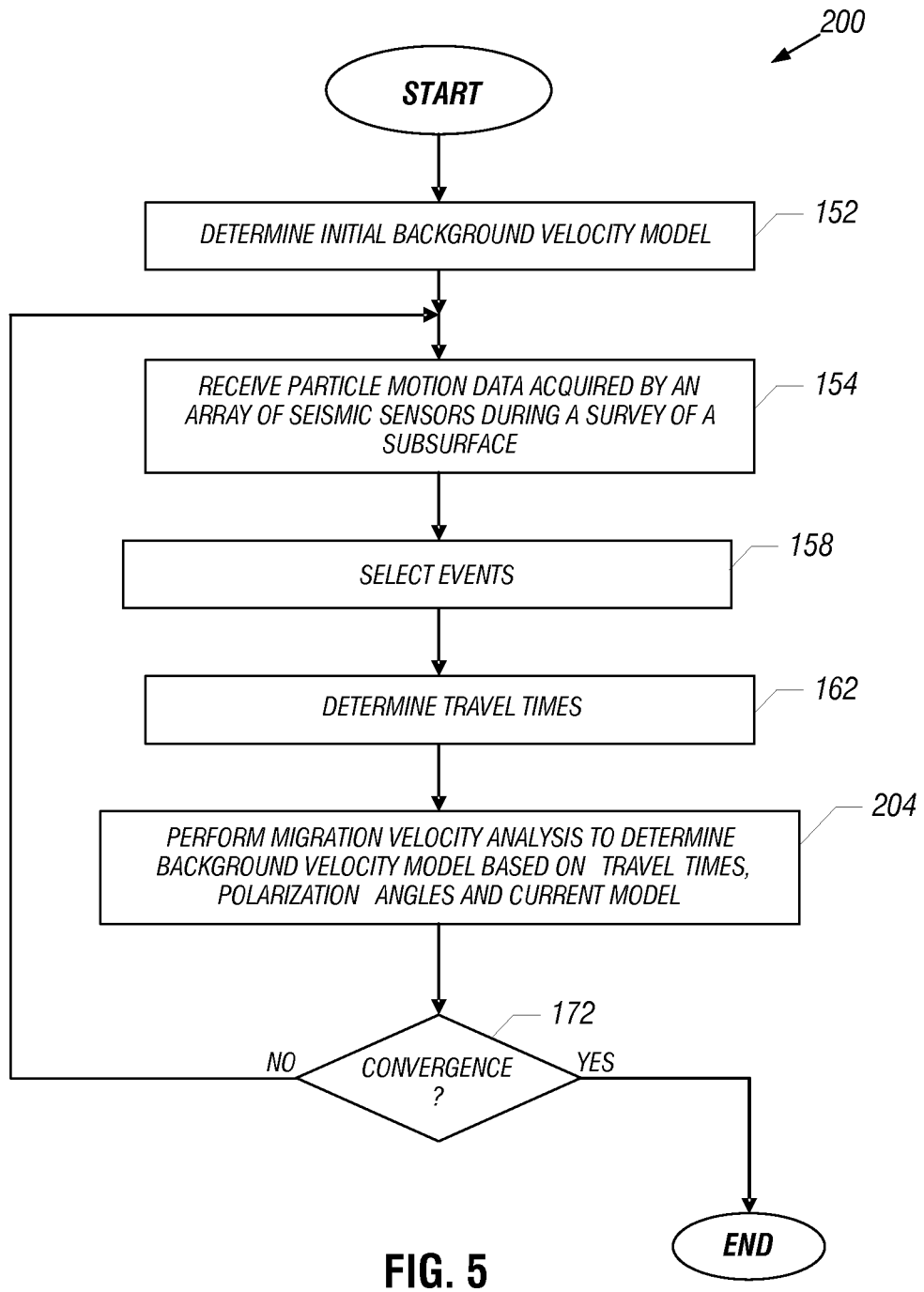

As another example, a technique 200, which is depicted in FIG. 5, may be used in accordance with other embodiments of the invention. In general, the technique 200 is similar to the technique 150. However, unlike the technique 150, the technique 200 does not determine the polarization angles of the selected events. Instead, the technique 200 includes performing (block 204) the MVA analysis to determine the background velocity model based on the travel times, particle motions and the current model. As another example, the MVA analysis may involve using both differences between observed and calculated polarization angles derived from particle motion data as well as differences between observed and calculated particle motions. Thus, many variations are contemplated and are within the scope of the appended claims.

Figure 6:
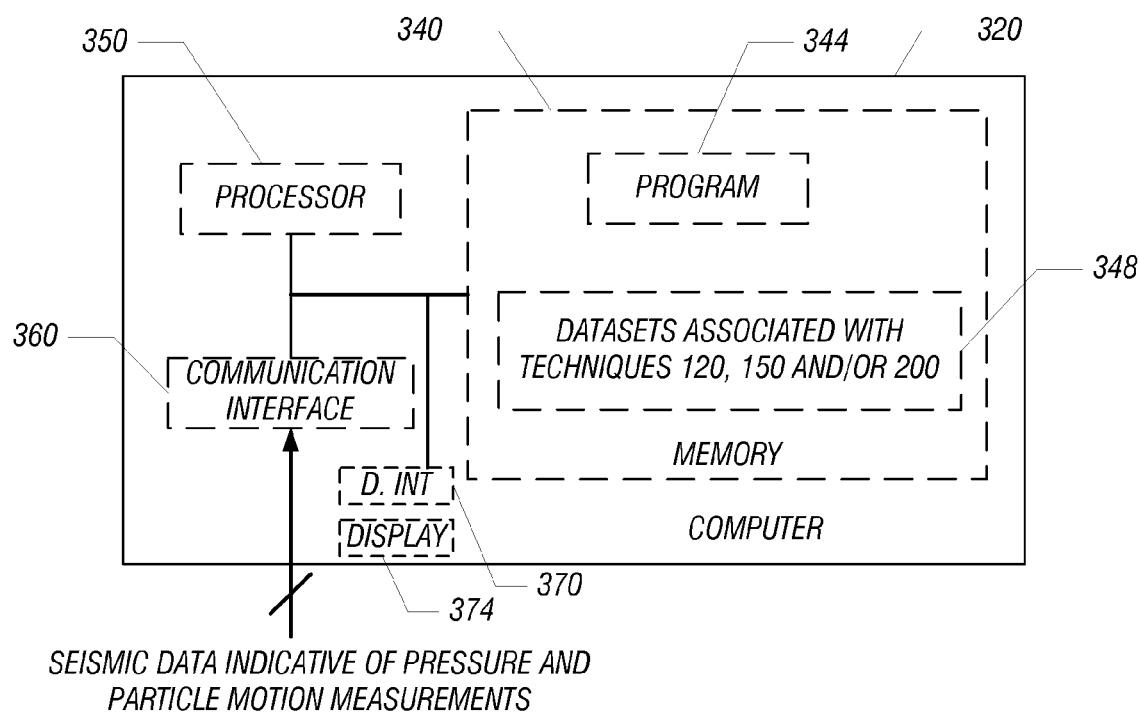
FIG. 6 is a schematic diagram of a processing system according to an embodiment of the invention.

Referring to FIG. 6, in accordance with some embodiments of the invention, a processing system 320 may perform at least part of the techniques that are disclosed herein, such as techniques related to receiving particle motion data acquired by seismic sensors during a survey of a subsurface and performing migration velocity analysis to determine a background velocity model of the subsurface based at least in part on the particle motion data; determining polarization angles of seismic events and using the determined polarization angles in the migration velocity analysis; using measured particle motions in the migration velocity analysis; displaying an image of a background model on a display; inverting a cost function for the background velocity model; etc.

The system 320 may be located on one of the streamers 30, on each streamer 30, distributed among the streamers 30, on the seismic source 104, on the survey vessel 30, at a remote land-based facility, etc. In accordance with some embodiments of the invention, the system 320 may include a processor 350, such as one or more microprocessors and/or microcontrollers.

The processor 350 may be coupled to a communication interface 360 for purposes of receiving data indicative of seismic measurements, model parameters, geophysical parameters, survey parameters, etc. The data pertaining to the seismic measurements may be pressure data, multi-component data, etc.

As a non-limiting example, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the system 320 and may store, for example, various input and/or output data sets 348 involved with the techniques that are described herein. The memory 340 may store program instructions 344, which when executed by the processor 350, may cause the processor 350 to perform at least part of the techniques that are described herein and display results obtained via the technique(s) on the display 374 of the system 320, in accordance with some embodiments of the invention. As shown in FIG. 6, the system 320 may include a display interface 370 that couples the display device 374 to the system 320.

Other embodiments are contemplated and are within the scope of the appended claims. For example, in accordance with some embodiments of the invention, the spread of seismic streamers may not include particle motion sensors. Instead, the spread may be an over/under streamer, for example, which contains pressure sensors that acquire pressure measurements which are then subsequently processed for purposes of deriving particle motion data. Therefore, the systems and techniques that are described herein may be applied to particle motion, regardless of whether the particle motion is directly acquired by sensors of the streamer spread or derived by processing seismic data acquired by the sensors. Thus, the techniques 120, 150 and/or 200, which are described herein may be performed using particle motion data, regardless of whether the particle motion data is acquired directly from particle motion sensors of the seismic spread or derived from seismic measurements acquired by the spread's sensors. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
receiving seismic data acquired by an array of seismic sensors during a towed marine survey of a subsurface; and
processing the seismic data in a processor-based machine to perform migration velocity analysis to determine a background velocity model of the subsurface based at least in part on an indication of particle motion derived from the seismic data, a covariance indicative of errors in the indication of the particle motion and a covariance indicative of errors in a current version of the model,
wherein the act of processing the seismic data to perform the migration velocity analysis comprises determining differences between particle motion measurements indicated by the seismic data and particle motion measurements calculated based on a current version of the model.

2. The method of claim 1, wherein the indication of particle motion is directly acquired by the array of seismic sensors or is derived by processing the seismic data.

3. The method of claim 1, wherein the act of processing the seismic data to perform performing the migration velocity analysis comprises performing a stereotomography analysis.

4. The method of claim 1, wherein the act of processing the seismic data to perform the migration velocity analysis comprises determining slopes associated with seismic events based on the particle motion, and determining differences between the determined slopes and slopes calculated based on a current version of the model.

5. The method of claim 1, wherein the act of processing the seismic data to perform the migration velocity analysis comprises determining differences between ray take off angles indicated by the particle motion and ray take off angles calculated based on a current version of the model.

6. A method comprising:
receiving seismic data acquired by an array of seismic sensors during a towed marine survey of a subsurface; and
processing the seismic data in a processor-based to perform migration velocity analysis to determine a background velocity model of the subsurface based at least in part on an indication of particle motion derived from the seismic data, a covariance indicative of errors in the indication of the particle motion and a covariance indicative of errors in a current version of the model;
wherein the act of processing the seismic data to perform the migration velocity analysis comprises:
in a first iteration, performing an inversion to determine a next version of the model based at least in part on a current version of the model and the indication of particle motion; and
repeating performing the inversion in at least one subsequent iteration until a predetermined convergence criteria is met.

7. The method of claim 1, further comprising:
towing an array of at least one streamer to acquire the seismic data.

8. A system comprising:
an interface to receive seismic data acquired during a towed marine survey of a subsurface; and
a processor to process the seismic data to perform migration velocity analysis to determine a background velocity model of the subsurface based at least in part on an indication of particle motion derived from the seismic data, a covariance indicative of errors in the indication of the particle motion data and a covariance indicative of errors in a current version of the model;

wherein the processor is adapted to determine differences between particle motion measurements indicated by the seismic data and particle motion measurements calculated based on a current version of the model.

9. The system of claim 8, wherein the indication of particle motion data is directly acquired by the array of seismic sensors or is derived by processing the seismic data.

10. The system of claim 8, wherein the processor is adapted to perform a stereotomography analysis to determine the background velocity model.

11. The system of claim 8, wherein the processor is adapted to determine slopes associated with seismic events based on the particle motion and determine differences between the determined slopes and slopes calculated based on a current version of the model.

12. The system of claim 8, wherein the processor is adapted to determine differences between array takeoff angles indicated by the particle motion and array takeoff angles calculated based on a current version of the model.

13. The system of claim 8, wherein the processor is adapted to:

in a first iteration, perform inversion to determine a next version of the model based at least in part on a current version of the model and the indication of the particle motion data; and repeat performing the inversion and preparation until a predetermined convergence criteria is met.

14. The system of claim 8, further comprising:

an array of seismic sensors to acquire the seismic data; and at least one vessel to tow the array.

* * * * *